Patented June 9, 1936

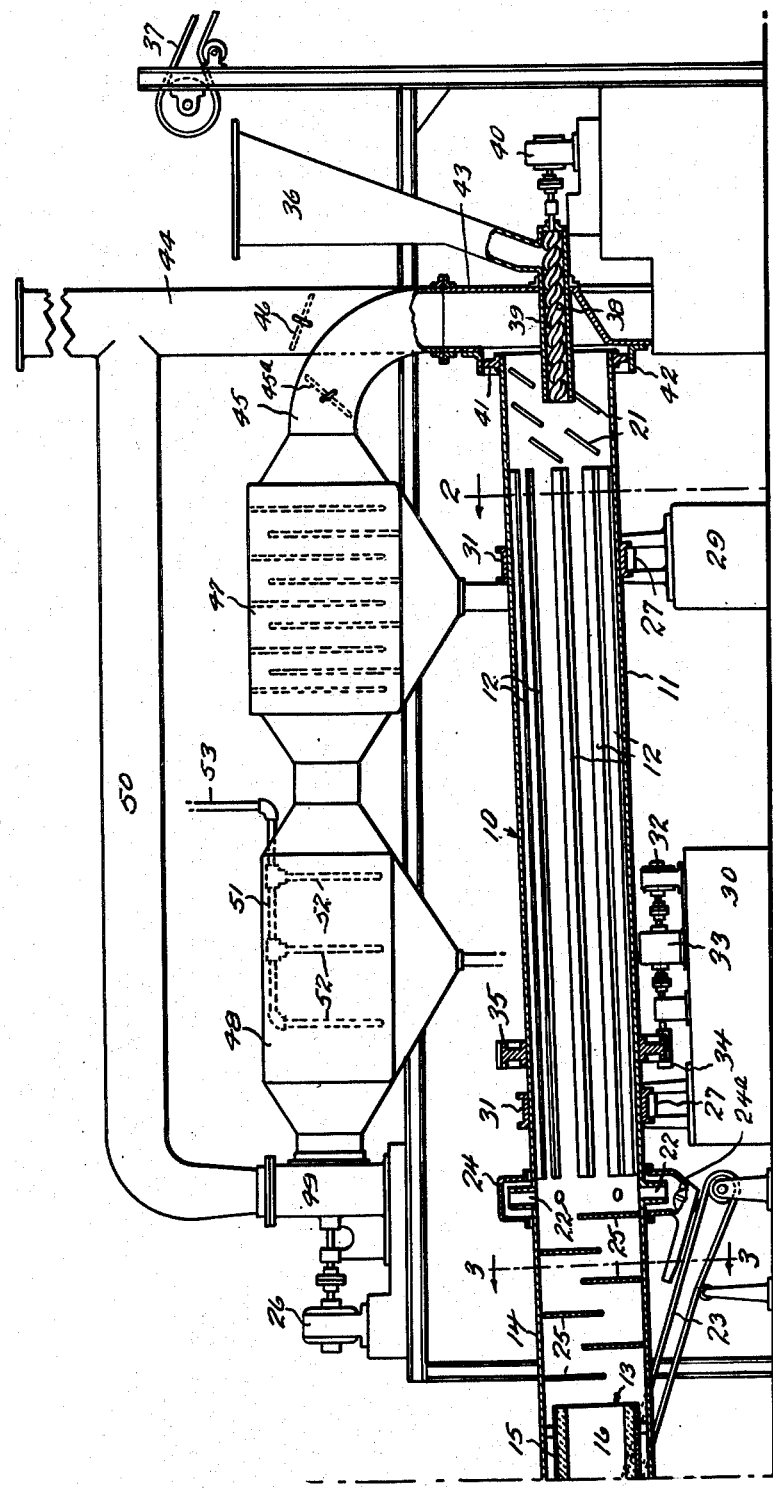

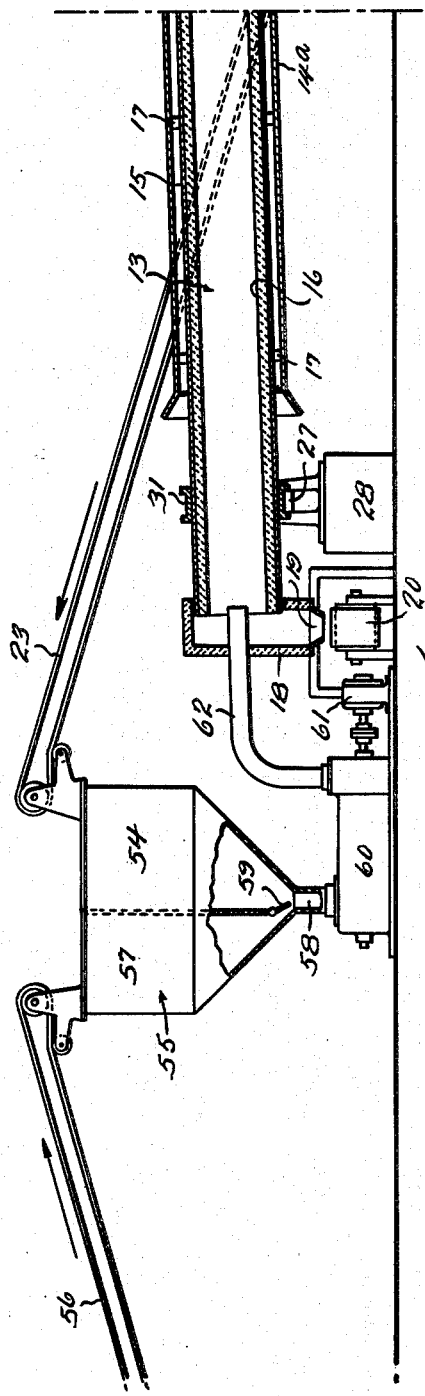
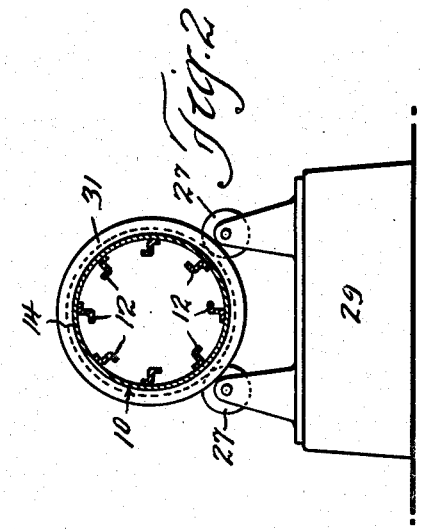
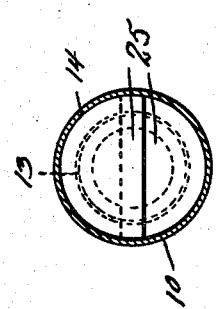

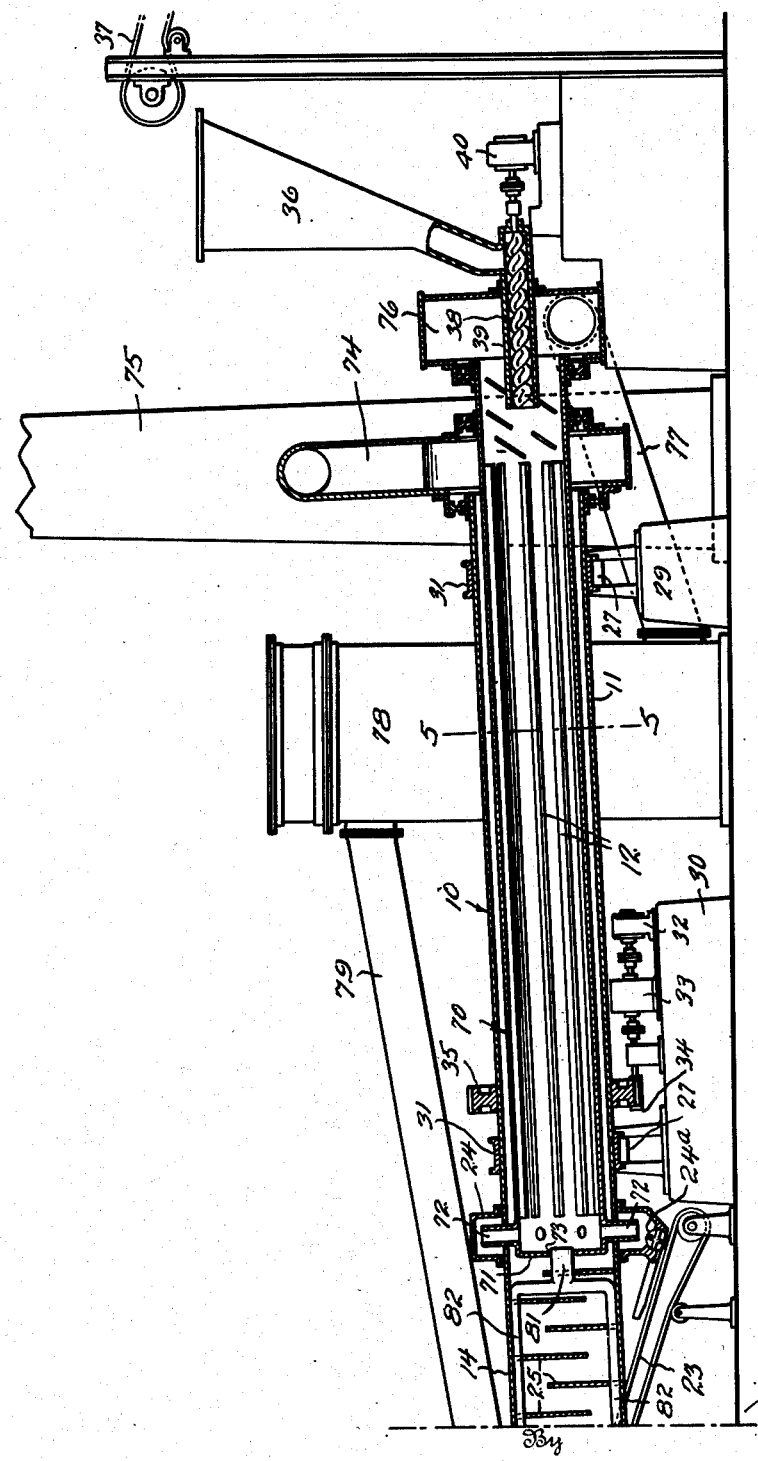

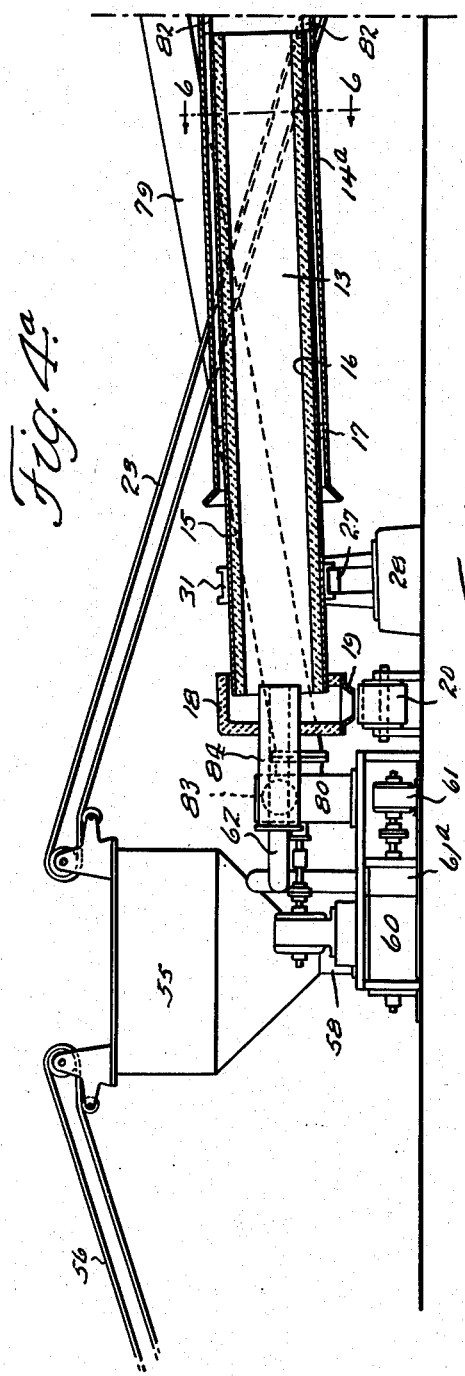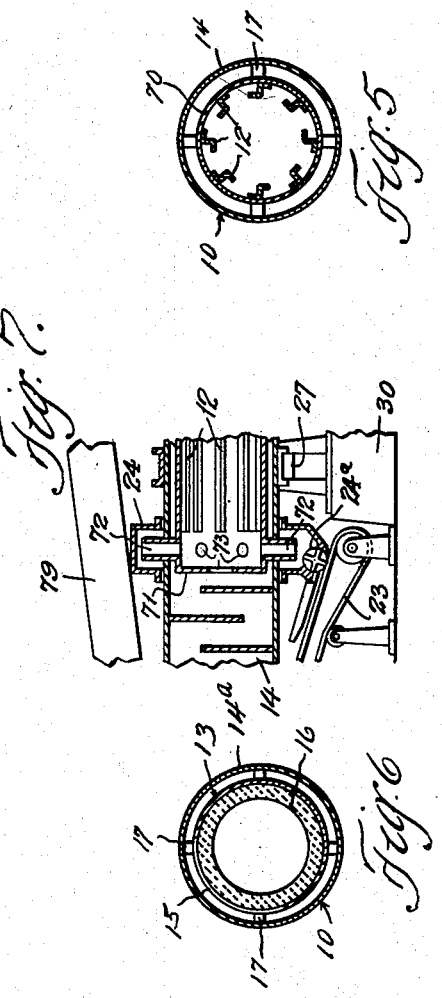

2,043,459

UNITED STATES PATENT OFFICE 2,043,459

SEWAGE DISPOSAL APPARATUS

Clifton N. Windecker, Painesville, Ohio

Application February 15, 1933, Serial No. 656,862

6 Claims. (Cl. 110—14)

This invention relates to a process and apparatus for use in sewage disposal and concerns primarily the drying and burning or other disposition of wet sludge resulting from treatment of various kinds.

It is well known that the sludge which is formed as an end product in various treatments of sewage contains a considerable percentage of organic matter and therefore cannot be dumped as it could if it contained only inorganic matter. This fact leads to the necessity for incineration or some other suitable disposal of the sludge. This invention relates to disposal by incineration and has for its object to provide for such incineration at minimum expense and by use of the simplest mechanism possible consistent with good results.

In order that the organic matter may be removed from the sludge by burning, it is necessary that the sludge should be first dried in order that it may be burnt quickly to avoid slow combustion and the production of noxious odors. I have found that where an attempt is made to incinerate this material by passing it slowly along an inclined tube at one end of which combustion is occurring, the material must traverse all temperature ranges from a relatively low temperature at one end of the tube to the temperature of combustion at the other. In such a process there exists a temperature range which in this specification I term the "scorching" range wherein the complex organic compounds existing in this material are only partially broken down and give rise to various complex and malodorous fixed gases. This "scorching" range may vary from 212° F. to the neighborhood of 1400° F. according to the composition of the sludge.

Broadly stated, it is the object of my invention to dry the sludge to a small moisture content at temperatures elevated considerably above ordinary room temperatures but below the "scorching" range and then introduce the dried sludge into a combustion chamber where the temperature is maintained above the "scorching" range, that is, at a temperature at which the malodorous gases are not stable. The combustion chamber should be above 1200° F. and may preferably be about 2000° F. Depending upon the percentage of organic matter contained in the sludge, it may be necessary to add a greater or lesser amount of combustible material in order to maintain the combustion temperature at the desired point. For this purpose, I prefer to grind the sludge and introduce it with the additional combustible to promote the quickest and most complete combustion.

Referring now to the accompanying drawings wherein Figs. 1 and 1ª constitute a schematic, vertical sectional elevation of an apparatus for carrying out my improved process; Fig. 2 is a view on line 2—2 of Fig. 1; Fig. 3 is a view on line 3—3 of Fig. 1; Figs. 4 and 4ª constitute a schematic vertical sectional elevation of a modified form of apparatus; Fig. 5 is a section on the line 5—5 of Fig. 4; Fig. 6 is a section on the line 6—6 of Fig. 4ª and Fig. 7 is a fragmentary sectional view corresponding to a portion of Fig. 4 with the manifold 81 and pipes 82 omitted. I shall describe two illustrative mechanisms for carrying out my improved process, the first to be described being applicable to those sludges which do not give up objectionable odors to gases passed in actual contact therewith at working temperatures and the second of somewhat more complicated construction being adaptable for other sludges.

Referring now to the apparatus of Figs. 1 to 3 inclusive, the numeral 10 indicates generally a cylinder within which the drying and burning is carried out and which may be conveniently considered as divided into a drying portion 11 provided on the interior face with agitating Z-bars 12, a refractory lined cylindrical portion 13 defining a combustion chamber and a baffle section 14 between the end of the cylinder 13 and the agitating bars 12. The portion 13 may consist of a metallic shell 15 lined with fire brick 16 and telescoping a portion of the shell 11, 14. The cylindrical member 13 is spaced from said shell by spiders 17 which permit the passage of air. I have shown the member 13 as rotatable with the remainder of the cylinder 10, although it is to be understood that provision may be made for independent rotation of these two or for the combustion member 13 remaining fixed, although preferably the construction is as shown, since the downward slope provides for feeding of non-combustible material toward the lower end and into the outlet member 18 from which it drops through an opening 19 upon a conveyor 20 by means of which it is carried away for any preferred disposition. Wherever the word "cylinder" is used herein, it is to be understood as indicating the entire tube 10, including the member 13, unless the context otherwise indicates, but not in a limiting sense.

The drying portion of the tube is provided at the upper end with angularly extending members 21 defining a helical feed adapted to transfer wet sludge toward the Z-bars 12. This feeding operation is relatively rapid as compared to the progress of the sludge from one end of the Z-bars to the other, which latter operation may require three or four hours. At the lower end of the Z-bars is provided a series of spouts 22 through which the dried sludge may be discharged upon a conveyor 23. A stationary guard 24 is provided in embracing relation to the spouts for causing all the discharged material to be deposited upon such conveyor. 24ª feeds out dried sludge without admitting air to pass through spouts 22.

It is to be understood that the portion 11 of the tube 10 may be constructed of material of low heat conductivity or it may be insulated either interiorly or exteriorly, preferably the latter.

The baffle portion 14 of the tube 10 is provided with a series of baffles 25 which may be of any shape as, for example, that shown, a plurality of plates of slightly more than semi-circular obstructing value as will be clear from Figs. 1 and 3. These baffles prevent the passage of high temperature gas currents within the tube and cause uniform mixing of the gases so that the material in the drying portion 11 will be subjected to incoming gas of substantially uniform temperature. Such temperature can be regulated by the length of the cylindrical portion 13 and by the amount of air passing between the member 13 and the outer shell. The baffles also serve to mix the air from this source with the gases and heated gases from the combustion chamber. It is to be understood that thermostatic means may be provided within or adjacent to the cylindrical portion 14 for controlling the amount of air admitted between the member 13 and the outer shell either by a valve controlling such supply or by regulation of the speed of the motor 26 as will hereinafter more clearly appear. It will be understood that the Z-bars 12 operate to agitate the sludge, prevent the formation of large lumps and thereby give better access of the heater gases to this material. Other agitating means may be substituted or added as will be obvious to one skilled in the art.

The cylinder 10 may be rotatably supported by a plurality of rollers 27 suitably supported on foundations 28, 29 and 30. Mounted upon the block 30 is a motor 32 connected through a suitable reducing gear mechanism 33 in driving relation to a pinion 34 meshing with a ring gear 35 surrounding the cylinder 10.

The wet sludge is fed to a hopper 36 by means of a conveyor 37, from which it is fed into the upper end of the cylinder 10 by a feed screw 38 rotated in a suitable housing 39 by a motor 40. The upper end of the cylinder 10 is closed by a seal 41 working within a cylindrical flange 42 of a housing means 43 in alignment with the stack 44. A passage 45 leads from the housing 43 to the stack 44 below a damper 46 to a dust collector 47 which may be of the baffle type, as shown, or a screen type, and thence through a condenser or scrubber 48, through a fan 49, driven by the motor 26, and back through a pipe 50 to the stack 44 above the damper 46. The passage 45 is provided with a damper 45ª which may be closed when the device is started to render effective the stack draft, or for controlling the draft through the cylinder 10. While the dust collector 47 is provided for the purpose of removing any dust that may reach that point, the amount will be small since the wet sludge in the cylinder 10 is being agitated and will hold any dust which may contact it, and since the cylinder in the drying portion will normally be heavily charged with water vapor, the wet sludge fed thereinto normally containing above 50% by weight of water. Within the condenser or scrubber 48 is a manifold 51 from which perforated spray heads 52 are taken off for spraying into this chamber cold water supplied through a pipe 53. This mechanism will remove most of the water vapor and prevent the emission from the smoke stack 44 of clouds thereof, as would otherwise occur. As hereinbefore indicated, the draft through the cylinder 10 may be regulated either thermostatically or manually by the speed of the motor 26. It may also be regulated by the damper 45ª within the passage 45. Should a dust collector and condenser be found unnecessary they may be omitted, and the gases discharged directly into the chimney where any residual odor occurring can be destroyed by the addition of a very small amount of chlorine gas, or hydrochlorides.

The conveyor 23 delivers the dried sludge into a compartment 54 of a hopper 55. A conveyor 56 delivers coal or other fuel into a compartment 57 thereof and the two compartments are in adjustable communication with each other and deliver to a passage 58. The movable baffle 59 may be used for the purpose of varying the proportion of material delivered from the two compartments. The dried sludge and fuel in proper proportions are delivered to a combined mill and fan 60 wherein the materials are beaten or otherwise milled into a state of fine subdivision and blown by the fan operated by the motor 61 through a feed-in tube 62 to the combustion chamber, that is, to the interior of the member 13.

From the foregoing, it will be seen that in operation wet sludge is fed into the upper end of the cylinder 10, progresses during a suitable drying period along the Z-bar agitators, being tumbled the while, after which it is discharged upon the conveyor 23, having been exposed to heated air and other gases at a temperature below the "scorching" range. The dried sludge is then carried by the conveyor 23 to the hopper 55 where it is mixed with powdered coal or other suitable fuel and milled to a state of fine subdivision. It is then blown into the combustion chamber where the organic constituents are burned instantaneously above the "scorching" temperature range and the gas is passed to the drying chamber while the non-combustible portions work backwardly and are delivered upon the conveyor 20.

Referring now to the modified form illustrated in Figs. 4 to 6 inclusive, wherein those parts which correspond to similar parts in the first form have been given the same numerals, it will be seen that I have provided a cylinder 10 and divided in the same general manner into a drying portion 11, a combustion chamber portion 13 over which a portion of the main shell telescopes as indicated at 14ª and a baffle section 14. The combustion chamber is defined by a metallic shell 15 lined with firebrick or other suitable refractory 16 and spaced from the main shell by spiders 17 of open work formation whereby to permit passage of air therethrough. The termination of the combustion chamber at the inlet end is defined by a member 18 delivering through the opening 19 onto the conveyor 20 in the same manner as in the first described form.

Within the main shell in the drying portion 11 is telescoped an inner shell 70 spaced from the main or outer shell by any suitable means and provided on the interior with agitating Z-bars 12. The member 70 is provided with a substantially closed end portion 71 provided with spouts 72 extending through the main outer shell and adapted to deliver into the member 24 and upon the conveyor 23. An opening 73 is provided in said substantially closed end 71 for receiving a manifold 81 provided with pipes 82 extending adjacent the main shell to a point near the end of the member 13 whereby to admit fresh heated air to the interior of the cylindrical member 70 for the purpose of carrying away the water vapor and other volatile material therefrom. The provision of the member 81, 82 for conducting fresh air to the shell 70 is optional and where the fan 61ᵃ delivers a sufficient amount of air to support combustion a mere opening 73 may be relied upon. The bulk of the gases, however, passes around the shell 70 whereby to heat the same and the sludge therewithin but out of actual contact with said sludge. It is to be understood that the shell 70 is constructed of metal or other material which is a good conductor of heat. Gases passing around the shell 70 are delivered into a pipe 74 and thence to a stack 75. The air or gases passing through the opening 73 into the shell 70, together with water vapor and other volatile material arising from sludge introduced thereinto is delivered from the end of the shell 70 at the right hand side on the drawings into a space 76 from which it passes through a pipe 77 to a device 78 which may embody a condenser or dust collector or both after which it passes through a pipe 79 to the inlet side of a fan 80 which delivers it through a pipe 83 and sleeve 84 surrounding the tube 62 to the interior of the member 13, that is, into the combustion chamber.

It will thus be seen that the major portion of the gases from the combustion chamber with a heat tempering admixture of air from the outside passes through the baffle portion 14 of the cylinder 10 where it is mixed and that the major portion passes around the shell 70 in heating relation to sludge therein and thence to the stack 75 while the minor portion passes through the opening or openings 73 to the interior of the shell 70 and carries away water vapor and other volatile material to the device 78 wherein a portion is liquefied and from which the remainder is returned in substantially dry condition to the combustion chamber. By this means the gases discharged from the stack 75 are rendered free of objectionable odors.

The sludge feeding means both for wet and dried sludge, the fuel feed means and the means for rotating the cylinder are the same in this form as that already described and need not be further elaborated.

From the foregoing, it will be seen that I have provided a method of sewage disposal which possesses the several advantages enumerated and that I have described illustrative examples of apparatus for carrying the method into effect. While I have described such illustrative embodiments of my invention, I wish it understood that I am not limited to the details of the disclosure but only in accordance with the appended claims and the prior art.

Having thus described my invention, what I claim is:

1. An incinerator comprising, in combination, a cylinder, means for rotating the same, means for feeding wet sludge into said cylinder, outlet means for removal of dried sludge therefrom, means for mixing such dried sludge with fuel, a combustion chamber, means for feeding the mixture of dried sludge and fuel to said combustion chamber, and means for mixing heated gases from said combustion chamber with air and passing the gaseous mixture through said cylinder, said cylinder being formed with passage means for conducting a major portion of said gaseous mixture in heating relation to wet sludge therein but out of actual contact therewith.

2. In an incinerator, an elongated cylinder, means for rotating said cylinder, means for feeding wet sludge into one end thereof, means for introducing combustible material at the other or combustion end thereof, outlet means intermediate the ends thereof for removal of dried sludge, baffle means between said outlet means and said combustion end, and air inlet means between said combustion end and said baffle means.

3. In an incinerator, an elongated cylinder having one end portion insulated to form a combustion chamber, means for rotating said cylinder, means for feeding wet sludge into the end thereof opposite said combustion chamber, means for introducing combustible material to said combustion chamber, outlet means intermediate the ends of said cylinder for removal of dried sludge, and baffle means between said outlet means and said combustion chamber.

4. In a device of the class described, a cylinder comprising a main shell and a cylindrical combustion chamber element telescoping within said shell, spaced therefrom for admission of air therebetween and terminating in an open end intermediate the ends of said main shell, a second shell within said main shell and spaced therefrom for passage of hot gases therebetween, said second shell having a partially closed end terminating within said main shell in spaced relation to the open end of said combustion chamber element, said partially closed end being provided with an inlet opening for a small portion of heated air, means for conducting heated air from the space between said combustion chamber element and said shell to said inlet opening, means for drawing gases from the interior of said second shell and delivering them to the combustion chamber, means for introducing wet sludge to said second shell, outlet means adjacent said partially closed end for removal of dried sludge therefrom, means for pulverizing said dried sludge, and means for introducing said pulverized sludge and fuel to said combustion chamber.

5. In a device of the class described, a cylinder comprising a main shell and a cylindrical combustion chamber element telescoping within said shell, spaced therefrom for admission of air therebetween and terminating in an open end intermediate the ends of said main shell, a second shell within said main shell and spaced therefrom for passage of hot gases therebetween, said second shell having a partially closed end terminating within said main shell in spaced relation to the open end of said combustion chamber element, said partially closed end being provided with an inlet opening for a small portion of heated air, means for conducting heated air from the space between said combustion chamber element and said shell to said inlet opening, means for drawing gases from the interior of said second shell and delivering them to the combustion chamber, means for introducing wet sludge to said second shell, outlet means adjacent said partially closed end for removal of dried sludge therefrom, means for pulverizing said dried sludge, and means for introducing said pulverized sludge and powdered, carbonaceous, solid fuel to said combustion chamber.

6. In a device of the class described, a cylinder comprising a main shell and a cylindrical combustion chamber element telescoping within said shell, spaced therefrom for admission of air therebetween and terminating in an open end intermediate the ends of said main shell, a second shell within said main shell and spaced therefrom for passage of hot gases therebetween, baffle means within said main shell between said combustion chamber and said second shell, said second shell having a partially closed end terminating within said main shell in spaced relation to the open end of said combustion chamber element, said partially closed end being provided with an inlet opening for a small portion of heated air, means for conducting heated air from the space between said combustion chamber element and said shell to said inlet opening, means for drawing gases from the interior of said second shell and delivering them to the combustion chamber, means for introducing wet sludge to said second shell, outlet means adjacent said partially closed end for removal of dried sludge therefrom, means for pulverizing said dried sludge, and means for introducing said pulverized sludge and fuel to said combustion chamber.

CLIFTON N. WINDECKER.